United States Patent [19]
Myers

[11] 3,905,413
[45] Sept. 16, 1975

[54] TUBELESS TIRE CHANGER

[76] Inventor: Clifford C. Myers, R.R. No. 1, Milan, Ill. 61264

[22] Filed: Aug. 30, 1973

[21] Appl. No.: 393,071

[52] U.S. Cl................................ 157/1.24; 157/1.26
[51] Int. Cl............................................. B60c 25/06
[58] Field of Search ....... 157/1.17, 1.22, 1.24, 1.26, 157/1.28; 144/288 A

[56] References Cited
UNITED STATES PATENTS

| | | | |
|---|---|---|---|
| 2,695,659 | 11/1954 | Athmann | 157/1.24 |
| 2,912,047 | 11/1959 | Douglas et al. | 157/1.24 |
| 3,557,861 | 1/1971 | Duquesne | 157/1.24 |

*Primary Examiner*—Al Lawrence Smith
*Assistant Examiner*—Harold P. Smith, Jr.
*Attorney, Agent, or Firm*—Merriam, Marshall, Shapiro & Klose

[57] ABSTRACT

A machine for removing and mounting tires comprising a tire iron rotated by a reciprocating source of power and an adjustable rim clamping device mounted on the same shaft that rotates the tire iron.

2 Claims, 4 Drawing Figures

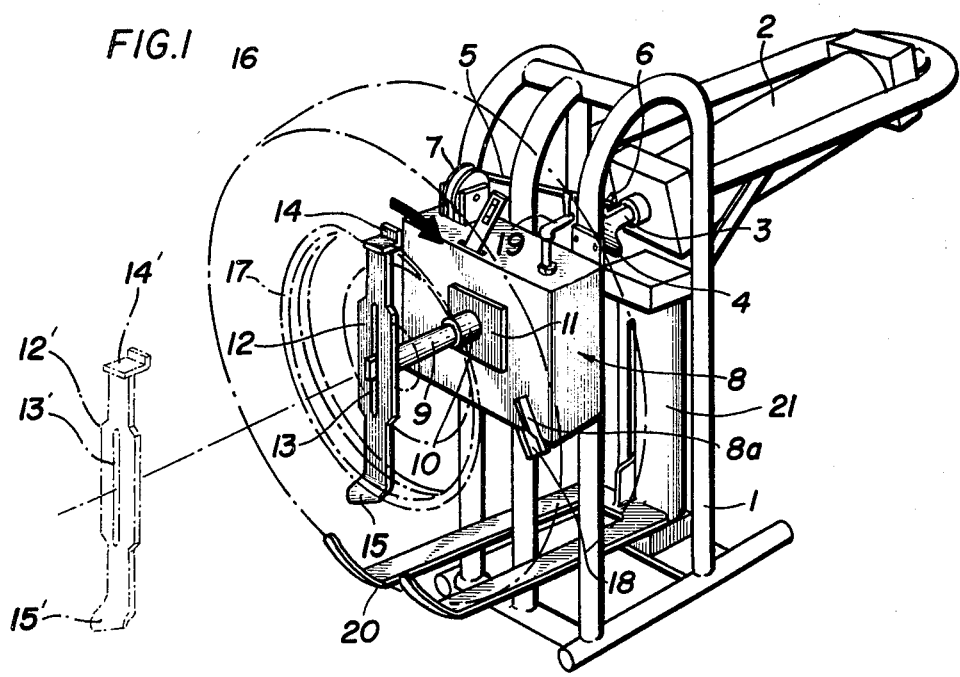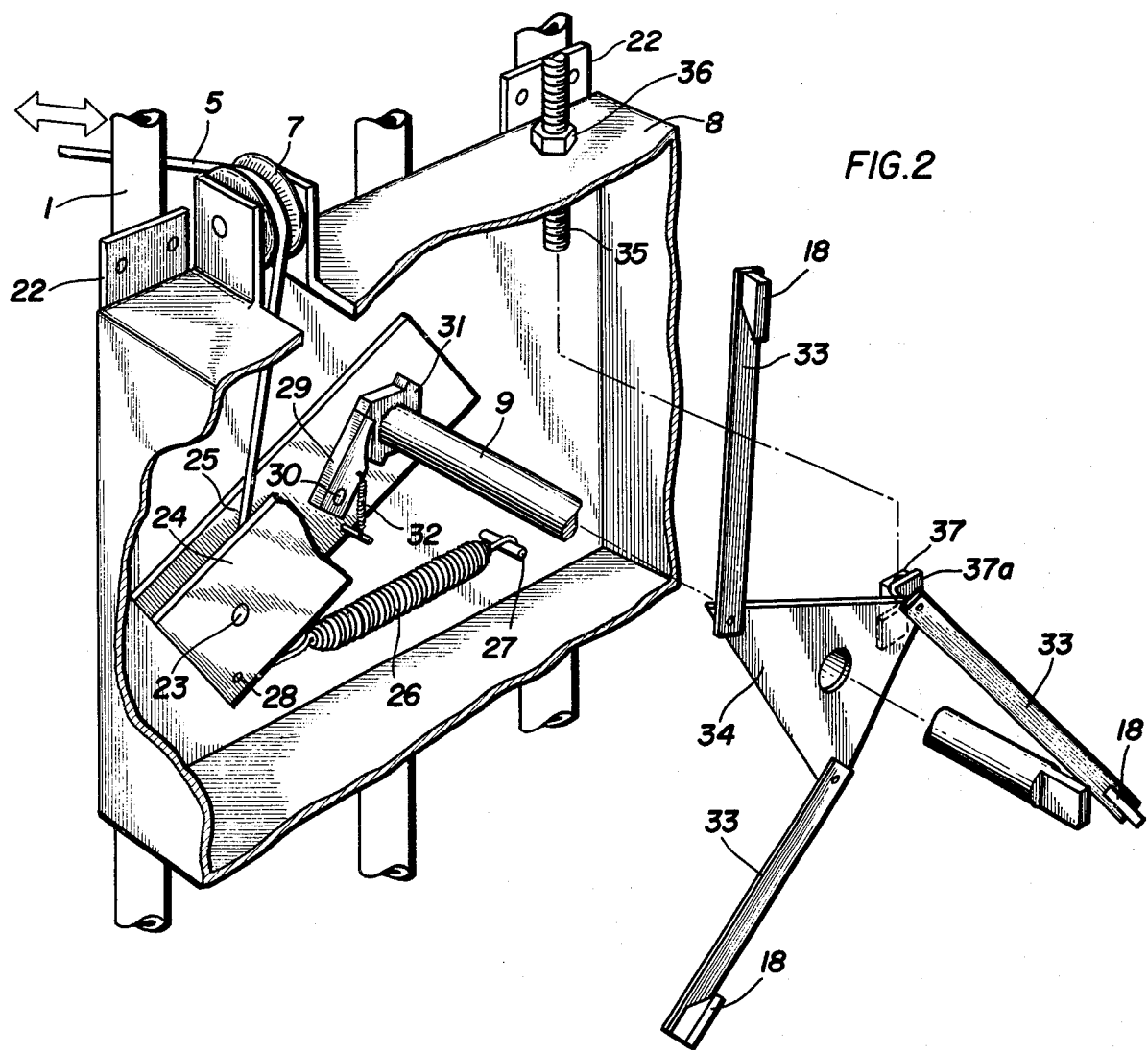

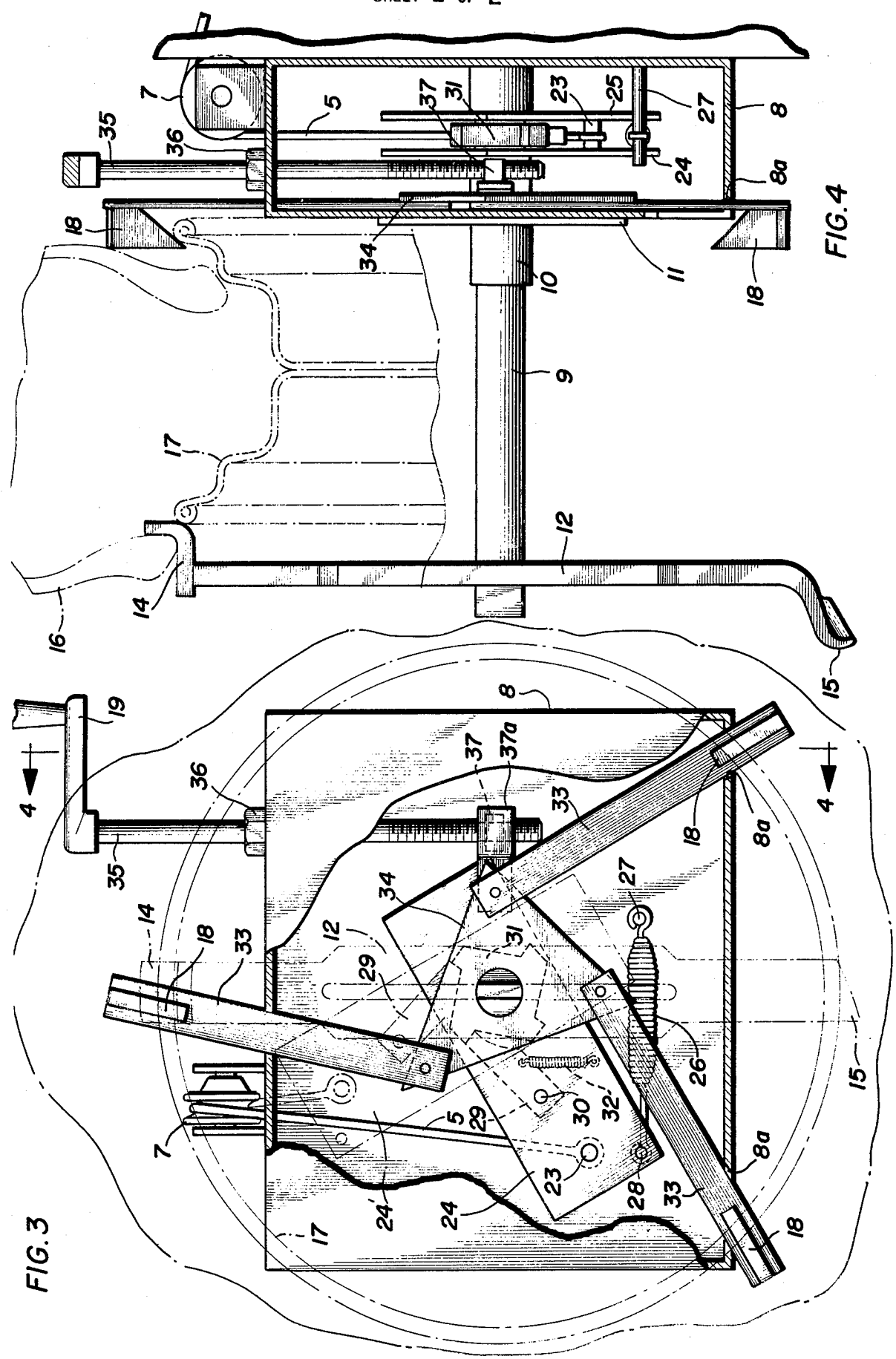

TUBELESS TIRE CHANGER

SUMMARY OF THE INVENTION

The invention is an apparatus for mounting and demounting tubeless tires, particularly large-sized tires, from their rims. Conveniently, the apparatus is associated with a pneumatic bead breaker and attached to the frame thereof. A source of reciprocating power is required that is suitably supplied by the bead breaker. Thus, the invention results in an especially efficient and low-cost system for service stations, truck and bus terminals and similar businesses where tubeless tires must be mounted or demounted for repairs and replacement.

As shown in the accompanying drawings, the apparatus provides an adjustable clamping means for holding the rim stationary while a tire iron is rotated by a reciprocating power source through a ratcheting mechanism.

BRIEF DESCRIPTION OF THE DRAWINGS

FIG. 1 illustrates the overall arrangement of the apparatus attached to a pneumatic bead breaker and a tire at the beginning of removal from its rim after the beads have been broken.

FIG. 2 is an exploded view of the mechanism for clamping the rim in a stationary position and for rotating the tire iron which prys the tire out of or onto the rim.

FIG. 3 is a front view of the apparatus, partially cut away, with the various parts shown in their operative relationship.

FIG. 4 is a cross-sectional side view at the plane 4—4 indicated in FIG. 3.

DETAILED DESCRIPTION

In FIG. 1, a bead breaking machine is shown comprising frame 1, reciprocating power means including a pneumatic cylinder 2 and a reciprocating rod 3 with a flattened end 4 for bead breaking. The cylinder 2 is activated from a conventional source of compressed air, not shown.

Flexible interconnecting means including a cable 5 is connected to a hook 6 on reciprocating rod 3 and passes around stationary pulley 7.

For safety reasons, the ratcheting mechanism and most of the rim clamping means are within an enclosure 8 mounted on frame 1. A horizontally extending rotatable shaft 9 extends therefrom journaled in bearing 10 which is reinforced by plate 11. A tire iron 12 is removably mounted on the end of shaft 9 extending through slot 13. The tire iron as removed from the shaft is illustrated as 12' with slot 13'. End 14 of the tire iron 13 is used to demount or pry off the tire 16 from rim 17. For mounting a tire such as 16 on rim 17 (shown in dashed lines) iron 13 is turned over and foot 15 forces the tire onto the rim 17 as shaft 9 is rotated in the same direction as when demounting the tire.

One rim clamp 18 is shown extending from slot 8a of enclosure 8. Extension or retraction of the clamps is effected by rotatable handle 19.

For convenience, a lift 20 may be provided that is raised or lowered by a second pneumatic cylinder 21.

In FIG. 2, the exploded view of enclosure 8 is shown with tabs 22 for clamping enclosure 8 to frame 1 with, for example U-bolts (not shown). Cable 5, alternately pulled and released, passes over pulley 7 and is connected to pin 23 secured in a lever including parallel plates 24 and 25 which rotate on shaft 9 between an unoperated position and an operated position displaced from the unoperated position. Parallel plates 24 and 25 are urged in the position shown by spring 26 attached at one end to lug 27 on enclosure 8 and at the other end to bolt 28 extending through plates 24 and 25. Pawl 29 rotates on stud 30 in plate 24 and is held against a gear or cam 31 by biasing means or spring 32 which returns the lever from the operated position to the unoperated position. Cam 31 is fixed to shaft 9, for example welded, so that when cam 31 is pushed by pawl 29, shaft 9 is rotated clockwise.

The tire and rim may be positioned upon shaft 9 by either manually lifting the tire and rim until positioned adjacent clamps 18 or by using a lift 20 which raises or lowers the tire and rim by second pneumatic cylinder 21.

Rim clamps 18 are on the ends of elongated arms 33 which are each pivotably mounted to triangular plate member 34 which is rotatable on shaft 9. Turning of an adjusting member or threaded rod 35 in a downward direction through a nut 36 fixed to enclosure 8 and through a nut 37 fixed to triangular plate 34 through pivoting bracket 37a, effects rotation of plate 34 (which is otherwise freely rotatable) on shaft 9 in a clockwise direction to thereby simultaneously extend arms 33 through slots 8a (FIGS. 1, 3 and 4) and to permit the release of clamps 18 on various sizes of tire rims (FIG. 4). By turning rod 35 in an upward direction plate 34 is rotated in a counterclockwise direction to thereby simultaneously retract arms 33 through slots 8a to grip and lock rim 17 in an upright position.

In FIG. 3, a partial cut-away front view of enclosure 8, the parts described above are shown assembled. Also, parallel plates 24 and 25, pawl 29 and cable 5, are shown as 24' and 25', 29' and 5' respectively when cable 5 is pulled away from enclosure 8 causing a one-quarter rotation in shaft 9. Triangular plate 34 and arms 33 are not affected by such rotation of shaft 9, and thus the positioning of clamps 18 with respect to an engaged tire rim 17 remains unchanged by successive one-quarter revolutions of shaft 9.

In FIG. 4, a cross-section at plane 4—4 (FIG. 3), the relationship of the parts in enclosure 8 is again shown. The relationships of tire iron 12 to a tire 16 and rim 17 and clamps 18 to rim 17 are especially illustrated.

I claim:

1. In an apparatus for breaking a bead between a tire and a rim, said apparatus including a frame, reciprocating power means for breaking said bead, an apparatus for mounting and demounting said tire and including a tire iron having first and second opposed end portions, the improvement comprising:

a horizontally extending shaft;
   means mounting said shaft to said frame for rotational movement of the shaft;
   means, including flexible interconnecting means, connecting said power means to said shaft for rotational movement of the shaft in response to the movement of the reciprocal power means;
   a plate member;
   means mounting said plate member on said frame for rotational movement of the plate member;
   an adjusting member;
   means mounting said adjusting member on said frame for movement of the adjusting member in a first direction in which said plate member is rotated in one direction and for movement of the adjusting member in a second direction in which said plate member is rotated in another direction opposite of said one direction;

rim clamping means including a plurality of elongated arm members each having first and second opposed end portions;

means mounting said first end portion of each of said arm members to said plate member for simultaneous extension of the arm members in response to said rotational movement of said plate member in said one direction and for simultaneous retraction of the arm members in response to said rotational movement of said plate member in said other direction opposite of said one direction;

means for positioning said tire and rim in an upright position adjacent said rim clamping means;

gripping means on said second end portion of each of said arm members for locking said tire rim in said upright position upon the retraction of said arm members; and means removably mounting said tire iron to said shaft for rotational movement of the tire iron in response to said rotational movement of said shaft in which said first end portion of said tire iron is used to demount said tire from said rim and in which said second end portion of said tire iron is used to mount said tire to said rim.

2. An improvement as set forth in claim 1 wherein said means connecting said power means to said shaft for rotational movement comprises:

a lever connected to said flexible interconnecting means;

means rotatably mounting said lever for movement between an unoperated position and an operated position displaced from said unoperated position;

a gear;

means for fixing said gear to said shaft;

a pawl;

means operably mounting said pawl to said lever for engagement with said gear; and, biasing means on said lever for returning the lever from said operated position to said unoperated position.

* * * * *